United States Patent [19]

Kaprelian

[11] 4,235,508

[45] Nov. 25, 1980

[54] DUAL FOCAL LENGTH OBJECTIVE

[75] Inventor: Edward K. Kaprelian, Mendham, N.J.

[73] Assignee: Questar Corporation, New Hope, Pa.

[21] Appl. No.: 925,548

[22] Filed: Jul. 17, 1978

[51] Int. Cl.$^3$ .............................................. G02B 17/00

[52] U.S. Cl. ........................................ 350/27; 350/42; 350/55

[58] Field of Search ...................... 350/27, 29, 37, 38, 350/42, 45, 54, 199, 200, 201, 229, 189, 183, 175 FS, 55, 204

[56] References Cited

U.S. PATENT DOCUMENTS

| | | | |
|---|---|---|---|
| 1,167,164 | 1/1916 | Grebe | 350/37 |
| 2,685,820 | 8/1954 | Kaprelian | 350/27 |
| 3,049,054 | 8/1962 | Waland | 350/200 |
| 3,363,962 | 1/1968 | Vogl | 350/204 |
| 3,454,326 | 7/1969 | Schlegel | 350/204 |
| 3,529,888 | 9/1970 | Buchroeder | 350/199 |
| 3,944,338 | 3/1976 | Fleischman | 350/204 |
| 4,061,420 | 12/1977 | Kaprelian et al. | 350/201 |

*Primary Examiner*—Jon W. Henry
*Attorney, Agent, or Firm*—Joseph G. Denny, III; Peter J. Patane

[57] ABSTRACT

The invention provides a highly corrected, parfocalized, two-focal-length optical system comprising a primary image producing group consisting of a catadioptric lens system which forms its image within a first, positive field lens, and a second group comprising a symmetrical relay system coaxial with the primary group and movable axially relative to the primary image producing group, the relay system reimaging the image formed by the primary group through a second, negative field lens onto the fixed plane of the final image, movement of the relay lens between its extreme positions permitting close focusing of the entire system without altering its overall length.

5 Claims, 3 Drawing Figures

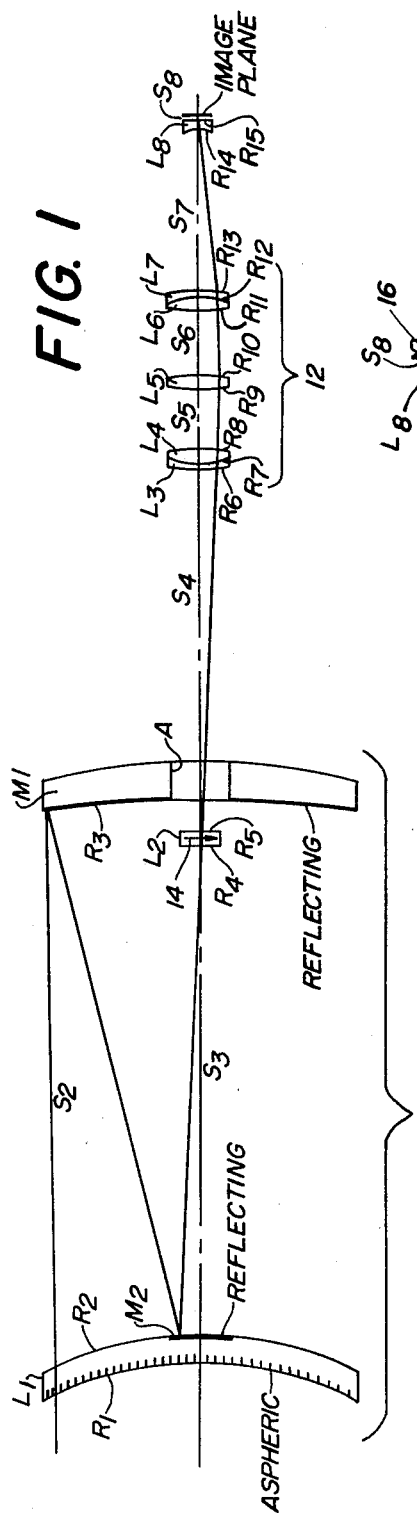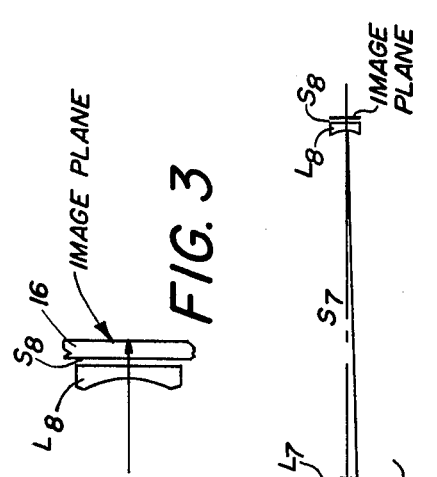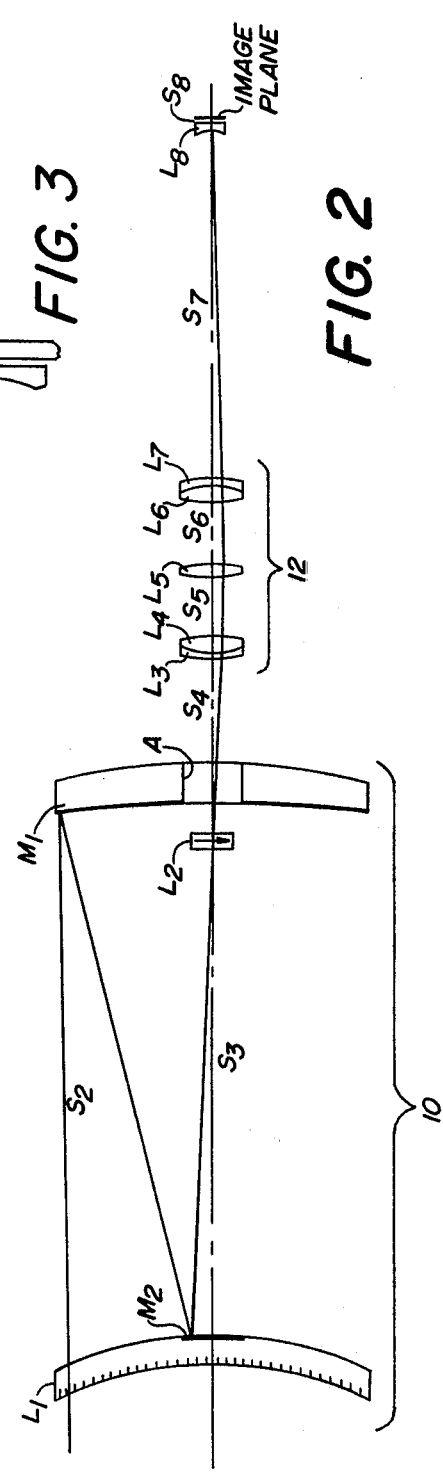

DUAL FOCAL LENGTH OBJECTIVE

BACKGROUND OF THE INVENTION

The present invention relates to reimaging lens systems of long focal length, and more specifically to a highly corrected design which can be adjusted to either of two focal lengths.

SUMMARY OF THE INVENTION

In many specialized telescopic and photographic imaging applications it is necessary to change the focal length of an optical system over a considerable range while maintaining the image points in a single, common plane, i.e., parfocalized. Typical of this kind of application is the tracking of missiles and rockets where relatively long focal lengths are necessary in order to record the target in adequately large scale. Because the distance from the observation site to the target changes during the latter's flight it is necessary to alter the focal length of the optical system in order to maintain a scale adequate for recording the required data. A range in focal length of 3 to 1, 4 to 1 and greater is customary.

There are several ways to achieve these changes in focal length in an optical system. The more practical systems employ (1) a zoom or continuously variable arrangement, (2) an interchangeable relay system in which relay lenses of various focal lengths are inserted into the system to reimage a primary image at different magnifications, and (3) an axially movable erector or relay lens system focused at either of its two conjugate distances to provide two different magnifications. Lenses of the first two types are known in the prior art, for example in U.S. Pat. Nos. 3,152,214 and 2,685,820.

The zoom systems, especially in the case of long focal lengths, are costly because of the greater complexity necessary for the zoom system, if good freedom from aberrations is to be maintained over the whole focal length range. However, in many applications a continuously variable focal length, as provided by zoom systems, is not required and a range of discreet focal lengths is adequate. Here the interchangeable relay system in which the relay lenses are mounted on a turret and are brought selectively to the optical axis is a candidate. This system has several drawbacks, the principal one being the difficulty in maintaining the close collimation required for maintaining the position of the images produced by each relay within a few seconds of true position. Another drawback is the difficulty in focusing such a system while maintaining good collimation.

The mechanical accuracy of the parts for a coaxial, movable relay system such as in the present invention can readily be achieved through good precision machining practice. Previous attempts to produce a high acuity system of the coaxially movable relay arrangement are not known to be successful because of the large amounts of uncorrectable coma, astigmatism and field curvature in such systems.

The present invention has overcome the problem in achieving high correction by
(1) placing in the plane of the image formed by the primary group a symmetrical positive field lens,
(2) employing a completely symmetrical relay lens system, and
(3) employing a negative field flattener of high power close to the final image plane.

One embodiment of this invention combines a $\sqrt{3}$ relay system with a catadioptric primary image former to yield a 3 to 1 range in magnification. The specific examples shown hereafter have focal lengths of 40 and 120 inches and cover a highly corrected substantially diffraction limited field of 15mm diameter or greater.

Other features and advantages of the invention will be apparent from the following description and claims and are illustrated in the accompanying drawings which shows structure embodying preferred features of the present invention and the principles thereof, and what are now considered to be the best modes in which to apply these principles.

BRIEF DESCRIPTION OF THE VIEWS

In the accompanying drawings which form a part of the specification:

FIG. 1 is a schematic diagram illustrating the preferred embodiment of the lens system of the present invention with the relay system in the short focal length position;

FIG. 2 is a schematic diagram similar to FIG. 1 but showing the embodiment of FIG. 1 wherein certain of the lens elements have been moved to the long focal length position; and FIG. 3 is a schematic diagram of the rear portion of FIGS. 1 and 2 showing a modification of the field lens on an enlarged scale.

DETAILED DESCRIPTION OF THE PREFERRED EMBODIMENTS

Referring to the drawings, FIGS. 1 and 2 illustrate a lens system drawn in accordance with the tables of constructional data shown hereinafter. In these tables the radius of curvature, the lens thickness, the axial distance between the lenses, and the glass parameters are specified as follows:

R = radius of curvature
t = thickness of lens
s = distance between lenses
$n_d$ = refractive index of the glass
v = dispersive index of the glass
efl = effective focal length of the system In conformance with custom in the lens design art, a plus sign accompanying the value for the radius of a surface denotes that the surface is convex to the object and a minus sign denotes that the surface is concave to the object. In these illustrations the object is at the long conjugate end of the system.

The dual focal length objective shown in FIGS. 1 and 2 comprises a catadioptric primary image forming system 10 consisting of a negative meniscus corrector lens or plate $L_1$ with an aspheric surface $R_1$ and a concave spherical mirror $M_1$ having a central aperture A, as shown. The surfaces of the corrector plate $L_1$ and of the mirror $M_1$ are concave toward the object. The corrector plate $L_1$ carries on its second (inner) surface a mirror $M_2$ which receives light after it has passed through the corrector plate $L_1$ and has been reflected by the mirror $M_1$. This results in a primary image 14 which falls within a positive field lens $L_2$. Reimaging the image 14 is achieved by an axially movable erector or relay lens system 12 comprising lenses $L_3$, $L_4$, $L_5$, $L_6$ and $L_7$. The final image falls immediately behind a negative field flattener lens $L_8$.

Preferably lenses $L_3$ and $L_4$ is a doublet and so are lenses $L_6$ and $L_7$ between which is the lens $L_5$ which is preferably a biconvex crown singlet, as shown. Also, preferably, the lens $L_5$ is spaced equidistant between the doublet $L_3$ and $L_4$ and the doublet $L_6$ and $L_7$. Further, preferably, the doublet $L_3$ and $L_4$ and the doublet $L_6$ and $L_7$ each comprise a biconvex crown element and a meniscus flint element, as illustrated in FIGS. 1 and 2, preferably with the flint elements outwardly, as shown.

Computer analysis has indicated that to achieve a high degree of correction with a minimum of optical elements, the positive field lens $L_2$ must be a symmetrical element, preferably of relatively low index of refraction and low dispersion, and the relay lens system 12 must be entirely symmetrical with a low index crown elements and moderately high index flint elements arranged in the form of a pair of outer doublets enclosing an air spaced crown singlet. The negative field flattener lens $L_8$ should also have relatively low index and low dispersion.

Two systems based on the above criteria are described as Examples I and II hereinafter. Both have effective focal lengths of 1016 mm (40 inches) and 3052 mm (120 inches) and have an aperture of 178 mm.

EXAMPLE I

| efl = 1016mm | | Thickness & Separation | $n_d$ | v |
|---|---|---|---|---|
| $L_1$ | $R_1 = -191.49$ (Aspheric) | $t_1 = 14.9$ | 1.5168 | 64.20 |
| | $R_2 = -200.00$ | | | |
| | | $S_2 = 324.74$ | | |
| $M_1$ | $R_3 = -783.6$ | | | |
| | | $S_2 = 324.74$ | | |
| $M_2$ | $R_2 = -200.00$ | | | |
| | | $S_3 = 296.97$ | | |
| | $R_4 = +261.7$ | | | |
| $L_2$ | | $t_2 = 10.0$ | 1.5168 | 64.20 |
| | $R_5 = -261.7$ | | | |
| | | $S_4 = 220.27$ | | |
| | $R_6 = +126$ | | | |
| $L_3$ | | $t_3 = 3.0$ | 1.6034 | 38.02 |
| | $R_7 = +48.3$ | | | |
| $L_4$ | | $t_4 = 6.0$ | 1.4875 | 70.04 |
| | $R_8 = -242.3$ | | | |
| | | $S_5 = 37.31$ | | |
| | $R_9 = +235.3$ | | | |
| $L_5$ | | $t_5 = 6.0$ | 1.4875 | 70.04 |
| | $R_{10} = -235.3$ | | | |
| | | $S_6 = 37.31$ | | |
| | $R_{11} = +242.3$ | | | |
| $L_6$ | | $t_6 = 6.0$ | 1.4875 | 70.04 |
| | $R_{12} = -48.3$ | | | |
| $L_7$ | | $t_7 = 3.0$ | 1.6034 | 38.02 |
| | $R_{13} = -126$ | | | |
| | | $S_7 = 101.75$ | | |
| | $R_{14} = -15.22$ | | | |
| $L_8$ | | $t_8 = 5.0$ | 1.5168 | 64.20 |
| | $R_{15} = \infty$ | | | |
| | | $S_8 = 1.0$ | | |

EXAMPLE II

| efl = 1016mm | | Thickness & Separation | $n_d$ | v |
|---|---|---|---|---|
| $L_1$ | $R_1 = -191.49$ (Aspheric) | $t_1 = 14.9$ | 1.5168 | 64.20 |
| | $R_2 = -200.00$ | | | |
| | | $S_2 = 324.5$ | | |
| $M_1$ | $R_3 = -783.6$ | | | |
| | | $S_2 = 324.5$ | | |
| $M_2$ | $R_2 = -200.00$ | | | |
| | | $S_3 = 300.0$ | | |
| | $R_4 = +200.00$ | | | |
| $L_2$ | | $t_2 = 10.0$ | 1.5168 | 64.20 |
| | $R_5 = -200$ | | | |
| | | $S_4 = 218.6$ | | |

-continued

| efl = 1016mm | | Thickness & Separation | $n_d$ | v |
|---|---|---|---|---|
| | $R_6 = +139.6$ | | | |
| $L_3$ | | $t_3 = 3.0$ | 1.6200 | 36.34 |
| | $R_7 = +53.7$ | | | |
| $L_4$ | | $t_4 = 6.1$ | 1.4875 | 70.04 |
| | $R_8 = -202.5$ | | | |
| | | $S_5 + 31.6$ | | |
| | $R_9 = +238.0$ | | | |
| $L_5$ | | $t_5 = 6.1$ | 1.4875 | 70.04 |
| | $R_{10} = -238.0$ | | | |
| | | $S_6 = 31.6$ | | |
| | $R_{11} = +202.5$ | | | |
| $L_6$ | | $t_6 = 6.1$ | 1.4875 | 70.04 |
| | $R_{12} = -53.7$ | | | |
| $L_7$ | | $t_7 = 3.0$ | 1.6200 | 36.34 |
| | $R_{13} = -139.6$ | | | |
| | | $S_7 = 104.5$ | | |
| | $R_{14} = -16.33$ | | | |
| $L_8$ | | $t_8 = 5.0$ | 1.5168 | 64.20 |
| | $R_{15} = \infty$ | | | |
| | | $S_8 = 1.0$ | | |

In both Examples I and II, the thickness (in millimeters) of the glass to be removed from $R_1$ in wavelengths of 5550 A° light at various distances from the lens vertex is:

| radius | | radius | |
|---|---|---|---|
| 10mm | 0.27 | 50mm | 4.47 |
| 20mm | 1.02 | 60mm | 5.05 |
| 30mm | 2.14 | 70mm | 4.71 |
| 40mm | 3.38 | 80mm | 3.03 |
| | | 89mm | 0 |

In both Examples I and II, the 5 mm glass thickness for the field flattener lens $L_8$ can be divided between the field flattener lens and any other plano element on the receptor, such as the tube face of a vidicon 16, as illustrated in FIG. 3., allowing the 1 mm space to fall between the plano surface of lens $L_8$ and the vidicon tube face.

It is to be noted that in both Examples I and II the relay lens system is wholly symmetrical with regard to radii, spacing and glass.

When the relay lens system $L_3$, $L_4$, $L_5$, $L_6$ and $L_7$ of Example I is moved as a unit away from the position shown and toward the primary image to yield the 3052 mm focal length (at infinity) all spacings remain as shown above except that distance $S_4$ becomes 102.1 mm and the distance $S_7$ becomes 219.85 mm.

When the relay lens system $L_3$, $L_4$, $L_5$, $L_6$ and $L_7$ of Example II is moved as a unit away from the position shown and toward the primary image to yield the 3052mm focal length (at infinity) all spacings remain as shown above, except that the distance $S_4$ becomes 105.0 mm and the distance $S_7$ becomes 218.1 mm.

In the interest of manufacturing economy only three types of glass have been employed for the lenses, all of low cost, and only six radii have been employed in the relay lens system and field flattener lens calling for only seven tools for the fabrication of these seven elements.

It will be seen from the foregoing description that other ranges of magnification, both greater and lesser than 3 to 1, and the use of other glass types, will suggest themselves to those skilled in the art.

Having described this invention, what I claim is:

1. A parfocalized dual focal length objective comprising a catadioptric primary image former (10) producing a primary image (14), a field lens in the plane of the primary image ($L_2$), a symmetrical, axially movable relay lens system (12) positionable at either of its two conjugate distances for reimaging the primary image at a final focal plane, and a negative field flattener ($L_8$) positioned forward of the final focal plane, said axially movable symmetrical relay system (12) comprising two spaced apart doublets ($L_3$, $L_4$ and $L_6$, $L_7$) and a biconvex crown singlet ($L_5$) between and spaced equidistantly from said doublets.

2. A parfocalized dual focal length objective according to claim 1, each of said doublets comprising a bioconvex crown element and a meniscus flint element.

3. A parfocalized dual focal length objective according to claim 2, said flint elements being positioned outermost in the relay system.

4. A parfocalized dual focal length objective as claimed in claim 1 wherein the elements have the following values:

| efl = 1016mm | Thickness & Separation | $n_d$ | v |
|---|---|---|---|
| $R_1 = -191.49$ (Aspheric) | | | |
| | $t_1 = 14.9$ | 1.5168 | 64.20 |
| $R_2 = -200.00$ | | | |
| | $S_2 = 324.74$ | | |
| $R_3 = -783.6$ | | | |
| | $S_2 = 324.74$ | | |
| $R_4 = -200.00$ | | | |
| | $S_3 = 296.97$ | | |
| $R_4 = +261.7$ | | | |
| | $t_2 = 10.0$ | 1.5168 | 64.20 |
| $R_5 = -261.7$ | | | |
| | $S_4 = 220.27$ | | |
| $R_6 = +126$ | | | |
| | $t_3 = 3.0$ | 1.6034 | 38.02 |
| $R_7 = +48.3$ | | | |
| | $t_4 = 6.0$ | 1.4875 | 70.04 |
| $R_8 = -242.3$ | | | |
| | $S_5 = 37.31$ | | |
| $R_9 = +235.3$ | | | |
| | $t_5 = 6.0$ | 1.4875 | 70.04 |
| $R_{10} = -235.3$ | | | |
| | $S_6 = 37.31$ | | |
| $R_{11} = +242.3$ | | | |
| | $t_6 = 6.0$ | 1.4875 | 70.04 |
| $R_{12} = -48.3$ | | | |
| | $t_7 = 3.0$ | 1.6034 | 38.02 |
| $R_{13} = -126$ | | | |
| | $S_7 = 101.75$ | | |
| $R_{14} = -15.22$ | | | |
| | $t_8 = 5.0$ | 1.5168 | 64.20 |
| $R_{15} = \infty$ | | | |
| | $S_8 = 1.0$ | | |

5. A parfocalized dual focal length objective as claimed in claim 1 wherein the elements have the following values:

| efl = 1016mm | Thickness & Separation | $n_d$ | v |
|---|---|---|---|
| $R_1 = -191.49$ (Aspheric) | | | |
| | $t_1 = 14.9$ | 1.5168 | 64.20 |
| $R_2 = -200.00$ | | | |
| | $S_2 = 324.5$ | | |
| $R_3 = -783.6$ | | | |
| | $S_2 = 324.5$ | | |
| $R_2 = -200.00$ | | | |
| | $S_3 = 300.0$ | | |
| $R_4 = +200.00$ | | | |
| | $t_2 = 10.0$ | 1.5168 | 64.20 |
| $R_5 = -200$ | | | |
| | $S_4 = 218.6$ | | |
| $R_6 = +139.6$ | | | |
| | $t_3 = 3.0$ | 1.6200 | 36.34 |
| $R_7 = +53.7$ | | | |
| | $t_4 = 6.1$ | 1.4875 | 70.04 |
| $R_8 = -202.5$ | | | |
| | $S_5 = 31.6$ | | |
| $R_9 = +238.0$ | | | |
| | $t_5 = 6.1$ | 1.4875 | 70.04 |
| $R_{10} = -238.0$ | | | |
| | $S_6 = 31.6$ | | |
| $R_{11} = +202.5$ | | | |
| | $t_6 = 6.1$ | 1.4875 | 70.04 |
| $R_{12} = -53.7$ | | | |
| | $t_7 = 3.0$ | 1.6200 | 36.34 |
| $R_{13} = -139.6$ | | | |
| | $S_7 = 104.5$ | | |
| $R_{14} = -16.33$ | | | |
| | $t_8 = 5.0$ | 1.5168 | 64.20 |
| $R_{15} = \infty$ | | | |
| | $S_8 = 1.0$ | | |

* * * * *